(12) United States Patent
Yamamoto

(10) Patent No.: US 9,028,598 B2
(45) Date of Patent: May 12, 2015

(54) DIESEL ENGINE EXHAUST PURIFICATION SYSTEM

(75) Inventor: Risa Yamamoto, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 149 days.

(21) Appl. No.: 13/703,745

(22) PCT Filed: May 26, 2011

(86) PCT No.: PCT/JP2011/062049
§ 371 (c)(1),
(2), (4) Date: Dec. 12, 2012

(87) PCT Pub. No.: WO2011/162068
PCT Pub. Date: Dec. 29, 2011

(65) Prior Publication Data
US 2013/0087048 A1 Apr. 11, 2013

(30) Foreign Application Priority Data

Jun. 25, 2010 (JP) ................................ 2010-144511

(51) Int. Cl.
*B01D 46/00* (2006.01)
*F01N 3/08* (2006.01)
*F01N 3/10* (2006.01)
(Continued)

(52) U.S. Cl.
CPC .......... *B01D 46/0063* (2013.01); *F01N 3/0842* (2013.01); *F01N 3/103* (2013.01); *F01N 9/002* (2013.01); *F01N 2430/085* (2013.01); *F02B 3/06* (2013.01); *F02B 37/22* (2013.01); *F02D 17/04* (2013.01); *F02D 41/029* (2013.01); *F02D 41/062* (2013.01); *F02D 41/405* (2013.01); *F02M 25/0707* (2013.01); *F02M 25/0718* (2013.01); *F02N 11/0814* (2013.01); *Y02T 10/44* (2013.01); *Y02T 10/47* (2013.01); *B01D 46/42* (2013.01); *B01D 46/46* (2013.01); *B01D 2279/30* (2013.01); *F01N 13/009* (2014.06)

(58) Field of Classification Search
CPC ............... B01D 46/04; B01D 46/4272; B01D 46/0068; Y02T 110/47; F02D 41/029; F02D 41/08; F01N 9/002
USPC ........................................................ 96/425
See application file for complete search history.

(56) References Cited

U.S. PATENT DOCUMENTS 4,719,751 A * 1/1988 Kume et al. ..................... 60/285
4,969,328 A * 11/1990 Kammel ........................ 60/275
(Continued)

FOREIGN PATENT DOCUMENTS

JP 2002-357117 A 12/2002
JP 2007-239468 A 9/2007
(Continued)

*Primary Examiner* — Amber Orlando
(74) *Attorney, Agent, or Firm* — Foley & Lardner LLP

(57) ABSTRACT

In a case where DPF regeneration is restarted after an engine is automatically restarted from interruption of the DPF regeneration, DPF regeneration control is corrected so as to suppress temperature rise due to the DPF regeneration in consideration of an increment in oxygen concentration in exhaust gas which is caused due to the interruption of the DPF regeneration. Specifically, restart of the DPF regeneration is prohibited during a predetermined prohibition time $\Delta T1$ from a time t1 at which the engine is automatically restarted, and a post injection amount of fuel is corrected to the side of reduction.

11 Claims, 11 Drawing Sheets

(51) Int. Cl.
*F01N 9/00* (2006.01)
*F02D 17/04* (2006.01)
*F02D 41/02* (2006.01)
*F02D 41/06* (2006.01)
*F02D 41/40* (2006.01)
*B01D 46/42* (2006.01)
*B01D 46/46* (2006.01)
*F01N 13/00* (2010.01)
*F02B 3/06* (2006.01)
*F02B 37/22* (2006.01)
*F02M 25/07* (2006.01)
*F02N 11/08* (2006.01)

(56) References Cited

U.S. PATENT DOCUMENTS

| | | | |
|---|---|---|---|
| 2005/0166580 A1* | 8/2005 | Pfaeffle et al. | 60/295 |
| 2006/0016177 A1* | 1/2006 | Tsutsumoto et al. | 60/295 |
| 2008/0000219 A1* | 1/2008 | Ratcliff et al. | 60/274 |
| 2011/0146246 A1* | 6/2011 | Farman et al. | 60/286 |

FOREIGN PATENT DOCUMENTS

| | | | |
|---|---|---|---|
| JP | 4012043 | B2 | 11/2007 |
| JP | 2004-150416 | A | 8/2009 |
| JP | 2009-191741 | A | 8/2009 |
| JP | 2010-024848 | A | 2/2010 |

* cited by examiner

DIESEL ENGINE EXHAUST PURIFICATION SYSTEM

TECHNICAL FIELD

The present invention relates to an exhaust gas purifying system for a diesel engine that carries out idle stop, and particularly relates to regeneration of a diesel particulate filter (hereinafter also referred to merely as a DPF).

BACKGROUND ART

Patent Literature 1 discloses a technology of accurately estimating a DPF temperature (i.e., a catalyst bed temperature) even during execution of idle stop in a diesel engine capable of carrying out idle stop to automatically stop the diesel engine during an idling operation. The DPF temperature is estimated in consideration of an amount of heat radiation of a catalyst and an amount of heat transfer thereof by using the temperature of exhaust gas on an upstream side of the catalyst during the execution of idle stop.

Patent Literature 2 also discloses a diesel engine that carries out idle stop to automatically stop the diesel engine during an idling operation. In the diesel engine of this conventional art, when shift to an idling operation is carried out during execution of regeneration of a DPF by post injection of fuel, idle stop is prohibited until the regeneration of the DPF is completed, and the regeneration of the DPF is continued during the idling operation. The reason therefor is that in a case where idle stop is carried out during execution of regeneration of the DPF and regeneration of the DPF is interrupted, a remarkable drop of the temperature of the DPF is caused to thereby necessitate a prolonged time and large energy until regeneration of the DPF is terminated.

However, in the above conventional art in which when shift to the idling operation is carried out during execution of regeneration of the DPF, idle stop is prohibited until the regeneration of the DPF is terminated, opportunity and frequency of conducting the idle stop is necessarily reduced, thereby lowering an effect of reducing exhaust gas and enhancing fuel economy by conducting the idle stop. To solve the above problem, the applicant of the present patent application has considered that when shift to idle stop is carried out during execution of regeneration of the DPF, the regeneration of the DPF is temporarily interrupted, and the regeneration of the DPF is restarted after shift from the idle stop to automatic restart of the engine is carried out.

However, in such a case where the regeneration of the DPF is restarted after carrying out shift from the idle stop to automatic restart of the engine, a difference between an estimation value of the temperature of the DPF and an actual temperature of the DPF tends to occur. Specifically, when fuel supply is stopped and idle stop is carried out, air is supplied into exhaust gas by idling until the engine is stopped, so that an oxygen concentration in the DPF becomes higher. Due to such an event, when post injection of fuel is carried out upon restarting regeneration of the DPF similarly to before interruption of regeneration of the DPF, there occurs an excessive temperature rise in which the temperature of the DPF temporarily becomes excessively higher. The excessive temperature rise tends to cause an adverse influence on the DPF or a drop in fuel economy.

CITATION LIST

Patent Literrature

Patent Literature 1: Japanese Patent Application Unexamined Publication No. 2010-24848
Patent Literature 2: Japanese Patent No. 4012043

SUMMARY OF INVENTION

The present invention has been made in view of such a new problem that occurs upon temporarily interrupting regeneration of the DPF when idle stop is carried out. An object of the present invention is to suppress an excessive temperature rise upon restarting the regeneration of the DPF after the engine is automatically restarted.

In one aspect of the present invention, there is provided an exhaust gas purifying system for a diesel engine, including An exhaust gas purifying system for a diesel engine that carries out idle stop to automatically stop the diesel engine during an idling operation, the exhaust gas purifying system including:

a diesel particulate filter (DPF) disposed in an exhaust system and serving to trap particulate matter present in exhaust gas;

a DPF regeneration section that executes DPF regeneration for a diesel particulate filter by raising the diesel particulate filter when a predetermined DPF regeneration condition is satisfied;

a DPF regeneration interruption section that interrupts the DPF regeneration and executes idle stop in a case where shift to the idling operation is carried out during the DPF regeneration;

a DPF regeneration restart section that restarts the DPF regeneration after the engine is automatically restarted from interruption of the DPF regeneration; and a correction section that corrects DPF regeneration control so as to suppress temperature rise due to the DPF regeneration in consideration of an increment in oxygen concentration in the exhaust gas which is caused due to idle of the engine during idle stop, when the DPF regeneration is restarted.

According to the present invention, even in a case where shift to an idling operation is carried out during regeneration of the DPF, the regeneration of the DPF is temporarily interrupted and idle stop is carried out. Therefore, opportunity and frequency of carrying out the idle stop are increased, so that it is possible to obtain an expected effect of reducing emission and an expected effect of enhancing fuel economy by the idle stop.

Further, according to the present invention, when regeneration of the DPF is restarted after the engine is automatically restarted, control of the regeneration of the DPF is corrected in consideration of an increment of an oxygen concentration in exhaust gas which is caused due to idling of the engine during idle stop as the regeneration of the DPF is interrupted. With this construction, it is possible to suppress an excessive temperature rise upon restarting the regeneration of the DPF and suppress deterioration of durability of the DPF and lowering of fuel economy.

DESCRIPTION OF EMBODIMENTS

Figure 1:
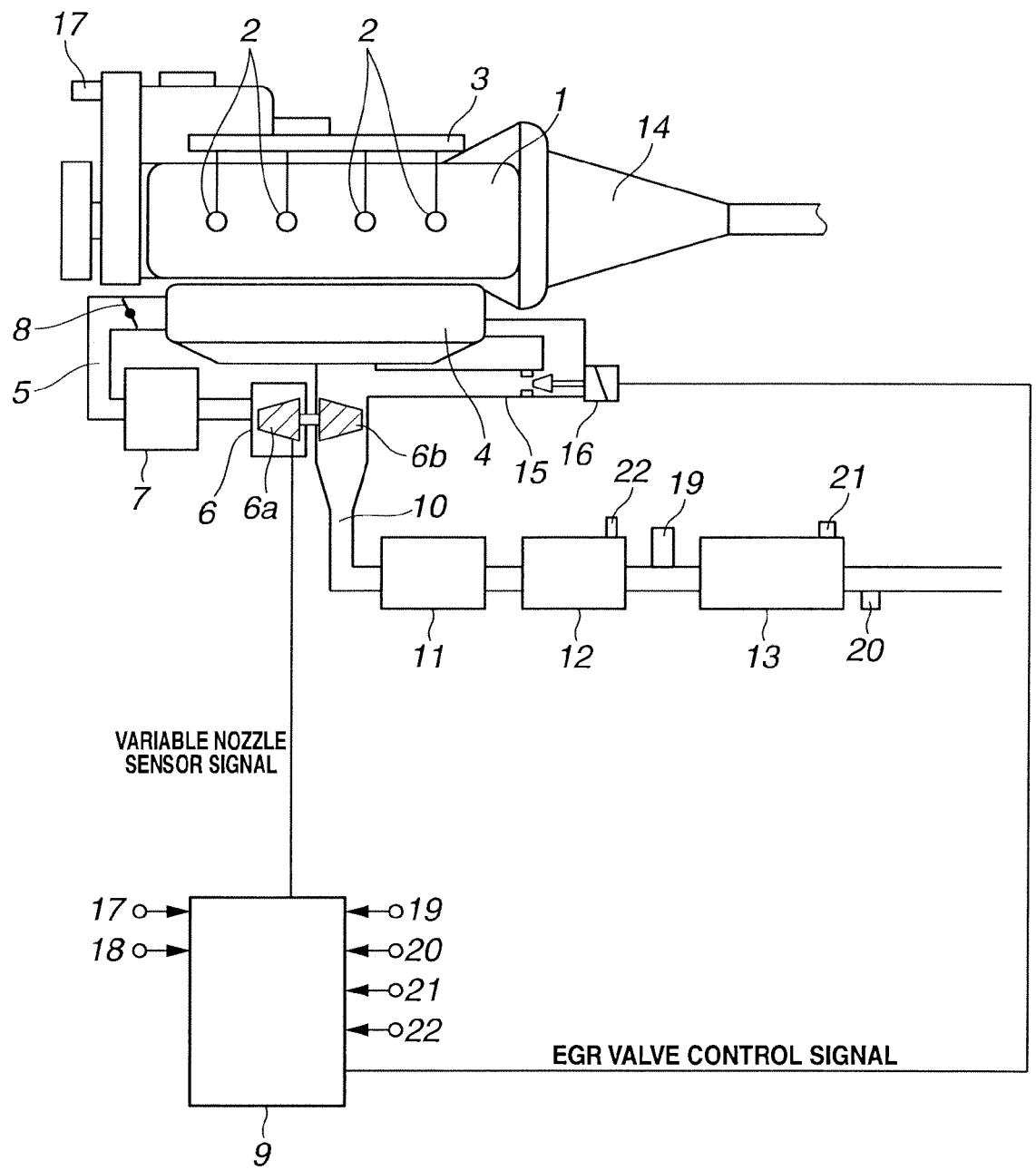
FIG. 1 is a schematic system diagram of a diesel engine to which an exhaust gas purifying system according to embodiments of the present invention are applicable.

In the following, preferred embodiments of the present invention are explained in detail by referring to the accompanying drawings. FIG. 1 is a schematic system diagram of a diesel engine to which an exhaust gas purifying system according to embodiments of the present invention are applicable. Reference numeral 1 denotes a diesel engine proper. Reference numeral 2 denotes a fuel injection valve of each of engine cylinders. Reference numeral 3 denotes a fuel injection apparatus having an accumulation chamber in which a high-pressure fuel is accumulated (hereinafter referred to as a common-rail fuel injection apparatus). Reference numerals 4, 5, and 10 denote an intake collector, an intake passage, and an exhaust passage, respectively. Reference numeral 9 denotes a control unit which stores and executes various controls, such as setting of a target regeneration temperature of diesel particulate filter (DPF) 13, control of raising a temperature of DPF 13 upon regeneration of DPF 13, etc., as explained later. Reference numeral 14 denotes a transmission which transmits a driving force of diesel engine proper 1 to a drive shaft. Transmission 14 may be either a stepwise variable transmission or a continuously variable transmission.

Fuel injection valves 2 are supplied with a high-pressure fuel by common-rail fuel injection apparatus 3. Fuel injection valves 2 are operated to open and close to inject the high-pressure fuel into the corresponding engine cylinders in response to an injection signal outputted from control unit (ECU) 9. Intake collector 4 is connected to respective intake ports of diesel engine proper 1. Intake passage 5 is connected to intake collector 4. Disposed in intake passage 5 are compressor 6a of variable nozzle turbocharger 6 for supercharging from an upstream side, inter-cooler 7 for cooling an air that has a high temperature due to compression by compressor 6a, and intake throttle valve 8 that controls an amount of intake air. Disposed in exhaust passage 10 sequentially from the upstream side are turbine 6b of variable nozzle turbocharger 6, oxidation catalyst 11 carrying a noble metal that oxidizes unburned component in exhaust gas, NOx absorption catalyst 12 serving to trap NOx in the exhaust gas, and DPF 13 serving to trap particulate matter (PM) present in the exhaust gas. Exhaust gas recirculation (EGR) passage 15 is branched from an upstream side of turbine 6b in exhaust passage 10 and connected to intake collector 4. EGR valve 16 is disposed in EGR passage 15, and controls an amount of exhaust gas recirculating into the intake air in accordance with an engine operating condition.

Detection signals from a plurality of sensors are inputted to ECU 9. The sensors include engine speed sensor 17 that detects engine speed (engine rotation number), accelerator opening sensor 18 that detects an accelerator opening degree, exhaust gas pressure sensor 19 that detects an exhaust gas pressure between oxidation catalyst 11 and DPF 13 in exhaust passage 10 (that is, an exhaust gas pressure on the upstream side of DPF 13), exhaust air-fuel ratio sensor 20 that detects an air-fuel ratio of the exhaust gas on the downstream side of DPF 13, temperature sensor 21 that detects a catalyst bed temperature of DPF 13 (i.e., a temperature of DPF 13), and temperature sensor 22 that detects a temperature of NOx absorption catalyst 12. An amount of PM trapped and accumulated in DPF 13 (i.e., a PM accumulation amount) is also inputted to ECU 9. ECU 9 calculates an opening degree of a variable nozzle vane of variable nozzle turbocharger 6 (i.e., a variable nozzle vane opening degree), an opening degree of EGR valve 16, an opening degree of intake throttle valve 8, and an amount of fuel to be injected by fuel injection valve 2 (i.e., an injection fuel amount), on the basis of the detection signals from the sensors, and outputs signals for controlling the variable nozzle vane opening degree of variable nozzle turbocharger 6, the EGR valve opening degree, the intake throttle valve opening degree, and the fuel injection amount. Further, ECU 9 determines a time of regeneration of DPF 13, and outputs a signal for actuating fuel injection valve 2 that serves to supply an amount of fuel which is necessary to raise the exhaust gas temperature for regeneration of DPF 13.

Figure 2:
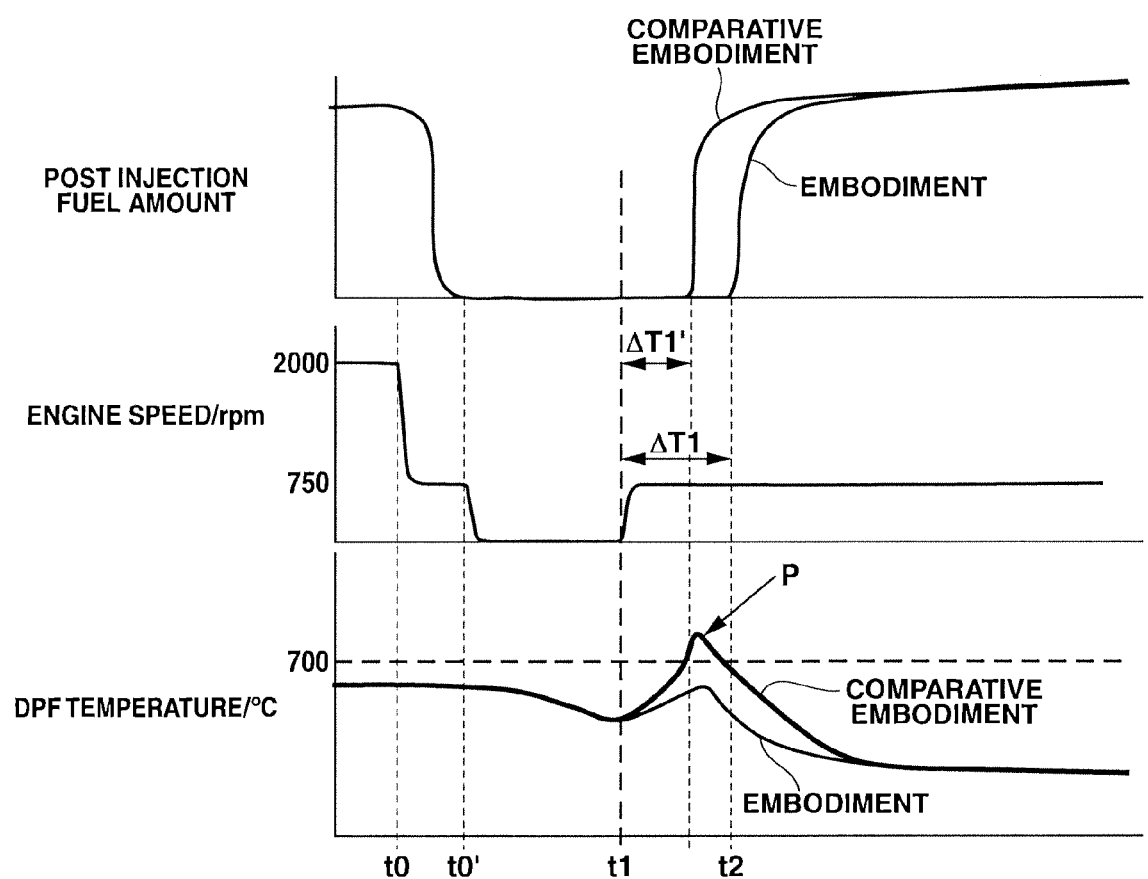
FIG. 2 is a timing chart showing a change in post injection fuel amount (amount of fuel for post injection), a change in engine speed, and a change in DPF temperature upon interrupting and restarting regeneration of a DPF in the embodiments of the present invention and a comparative embodiment.

Next, referring to a timing chart of FIG. 2, and flowcharts of FIG. 3 to FIG. 7, control of regeneration of DPF 13, particularly, control of restart of regeneration of DPF 13 which is executed after the engine is automatically restarted from temporary interruption of the DPF regeneration in accordance with idle stop, according to a first embodiment and a second embodiment of the present invention, is explained.

Referring to FIG. 2, there are shown a characteristic of DPF regeneration control of the first and second embodiments and a characteristic of that of a comparative embodiment. The characteristic of the first and second embodiments is exhibited in a case where when restarting the DPF regeneration after automatic stop of the engine, start time t2 for post injection of fuel is delayed, and an amount of fuel for the post injection (i.e., a post injection fuel amount) is corrected to the side of reduction, as explained later. The characteristic of the comparative embodiment is exhibited in a case where when restarting the DPF regeneration after automatic stop of the engine, correction of a start time for post injection of fuel and an amount of fuel for the post injection is not made.

As shown in FIG. 2, in a case where shift to an idling operation is carried out during the DPF regeneration, the DPF regeneration, i.e., the post injection of fuel, is temporarily interrupted, and idle stop is carried out, and then the DPF regeneration (the post injection of fuel) is restarted at appropriate time t2 after the engine is automatically restarted from the idle stop. As a result, it is possible to avoid reduction of opportunity and frequency of carrying out the idle stop due to the DPF regeneration, and obtain an expected effect of reducing emission and an expected effect of enhancing fuel economy by the idle stop. In the first and second embodiments, shift to an idling operation is carried out at time t0 at which the idling operation is requested, and the idle stop is carried out at time t0' at which the idling operation is stabilized. However, the idle stop may be carried out immediately at time t0 at which the idling operation is requested. When the shift to an idling operation is completed, not only a main injection of fuel but also the post injection of fuel are stopped so that the DPF regeneration by the post injection of fuel is interrupted. In addition, the DPF regeneration may be interrupted by stopping the post injection immediately at time t0 at which the shift to an idling operation is carried out.

Figure 3:
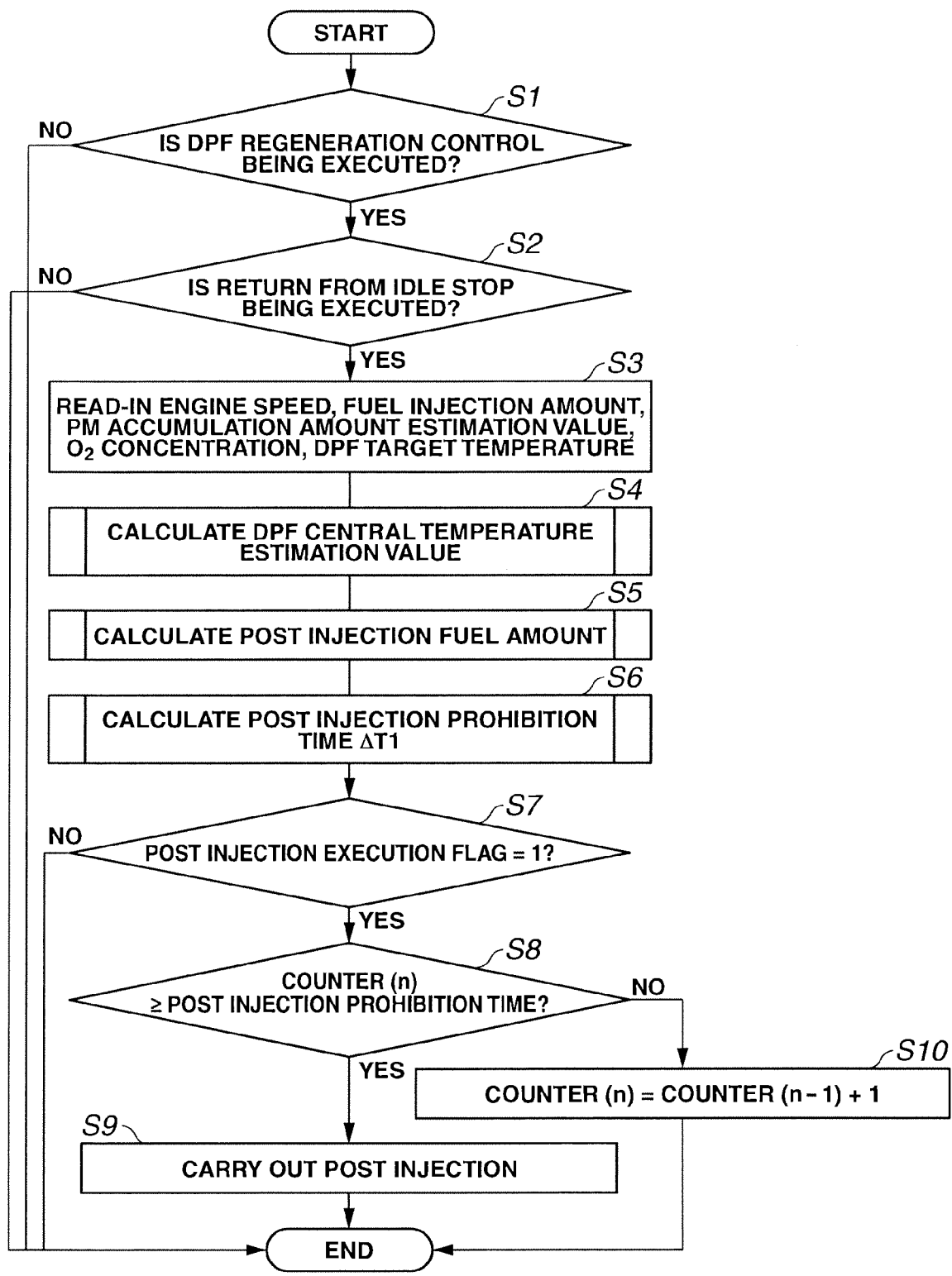
FIG. 3 is a flowchart of a routine which is executed for control of restart of DPF regeneration upon automatic restart of the engine according to a first embodiment and a second embodiment of the present invention.

FIG. 3 is a flowchart of the main routine for controlling regeneration of DPF 13 which is executed by ECU 9. This routine is repeatedly executed at predetermined short intervals, for instance, 10 milliseconds.

In step S1, it is judged whether or not DPF regeneration control is being executed (including interruption of DPF regeneration due to idle stop). As generally known, the DPF regeneration is executed by periodically removing the PM (mainly soot) trapped and accumulated in a DPF by burning, etc. in order to allow continuous use of the DPF. In the first and second embodiments, the DPF regeneration is performed by combination of oxidation catalyst 11 as generally known and post injection of fuel. The post injection of fuel serves for raising the exhaust gas temperature and is carried out at a non-ignition timing on or subsequent to an expansion stroke later than a compression top dead center (i.e., top dead center of a compression stroke) after main injection of fuel is conducted in the vicinity of the compression top dead center. However, the method of regenerating the DPF is not limited to the combination of oxidation catalyst 11 and the post injection of fuel according to this embodiment, and may be a DPF regenerating method using a heater or the like. When the answer in step S1 is YES indicating that the DPF regeneration is being executed, the logic flow proceeds to step S2. When the answer in step S1 is NO indicating that the DPF regeneration is not being executed, the logic flow is ended.

In step S2, it is judged whether or not return from the idle stop is being executed by releasing a brake pedal, etc., that is, the engine is being automatically restarted from the idle stop. This judgment can be made using a suitable flag. When in step S2, it is judged that the engine is being automatically restarted from the idle stop, the logic flow proceeds to step S3 and the subsequent steps, and automatic restart of the engine from the idle stop is commenced, that is, the main injection of fuel is conducted in the vicinity of the compression top dead center. When in step S2, it is judged that the engine is not being automatically restarted from the idle stop, the logic flow is ended. That is, in a case where it is judged that the engine is being automatically restarted from the idle stop that is followed by interruption of the DPF regeneration, both the judgment in step S1 and the judgment in step S2 are affirmative, and the logic flow proceeds to step S3 and the subsequent steps.

In step S3, various signals indicating an engine operating condition, i.e., an engine speed, a fuel injection amount, an estimation value of the PM accumulation amount (PM accumulation amount estimation value), an oxygen ($O_2$) concentration, a DPF target temperature, etc., are read in. In step 4, an estimation value of a central portion of the DPF, i.e., a DPF central temperature estimation value (hereinafter also referred to as a DPF temperature estimation value, a DPF estimate temperature, or simply a DPF temperature) is calculated by executing a subroutine of FIG. 7 as explained later. In step S5, an amount of a post injection of fuel is calculated by executing a subroutine of FIG. 4 according to the first embodiment or a subroutine of FIG. 5 according to the second embodiment as explained later. In step S6, a post injection prohibition time $\Delta T1$ is calculated by executing a subroutine of FIG. 6 as explained later.

In step S7, it is judged whether or not a post injection execution flag is 1. The post injection execution flag is set to 1 in a case where upon automatically restarting the engine from the idle stop that is followed by interruption of the DPF regeneration, a condition for restarting the DPF regeneration by the post injection (except for a condition concerning the post injection prohibition time $\Delta T1$ in step S8) is satisfied. The post injection execution flag is set to 0 in a case where upon automatically restarting the engine from the idle stop, the condition for restarting the DPF regeneration by the post injection is not satisfied. For instance, during a considerably short time period from the time at which the engine is automatically restarted to the time at which the engine operation is stabilized (see time period $\Delta T1'$ as shown in FIG. 2), the post injection execution flag is set to 0, and restart of the DPF regeneration by the post injection is prohibited.

In step S8, it is judged whether or not an elapsed time from start time t1 at which automatic restart of the engine is started has reached a predetermined post injection prohibition time (i.e., a post injection prohibition time period) $\Delta T1$. Specifically, it is judged whether or not a value of a counter that is reset to 0 at the start time t1 at which automatic restart of the engine is started, has reached to a predetermined value. When in step S8, it is judged that the elapsed time from the start time t1 at which automatic restart of the engine is started has reached the post injection prohibition time $\Delta T1$, the logic flow proceeds from step S8 to step S9 in which the post injection is carried out.

On the other hand, in a case where in step S8 it is judged that the elapsed time from the start time t1 has not reached the post injection prohibition time $\Delta T1$, the logic flow proceeds from step S8 to step S10 in which 1 is added to the value of the counter. Thus, in the first and second embodiments, the DPF regeneration by the post injection is prohibited during the predetermined post injection prohibition time $\Delta T1$ from the time at which automatic restart of the engine is started, such that excessive temperature rise upon restarting the DPF regeneration can be suppressed.

The reason for setting the post injection prohibition time $\Delta T1$ will be explained hereinafter by referring to FIG. 2.

During the idle stop, the engine is idle so that fresh air is directly supplied to the exhaust passage without fuel injection. Therefore, during the idle stop, the engine is stopped under a condition that an oxygen concentration in an exhaust system on an upstream side of the DPF becomes high. When returning from the idle stop, the engine is allowed to start to thereby supply an exhaust gas having a high oxygen concentration to the DPF immediately after restart of the DPF regeneration, so that oxygen concentration in the exhaust gas is temporarily largely increased. Therefore, as shown in the comparative embodiment, when the post injection of fuel is carried out immediately after the short time ΔT1' has elapsed from restart of the DPF regeneration, there is a fear that a temporary large rise in the DPF temperature is caused to largely exceed an upper limit of the DPF target temperature (for example, 700° C.) as indicated by sign P due to oxidation reaction that is facilitated by supplying the fuel by the post injection under the circumstances that the oxygen concentration is high. Accordingly, in the first and second embodiments, the post injection of fuel is prohibited during the predetermined post injection prohibition time ΔT1 from the start time t1 at which the engine is automatically restarted, such that the post injection of fuel is not carried out immediately after restart of the DPF regeneration under the circumstances that the oxygen concentration is high. As a result, it is possible to suppress and avoid the above-described excessive rise in the DPF temperature.

Figure 4:
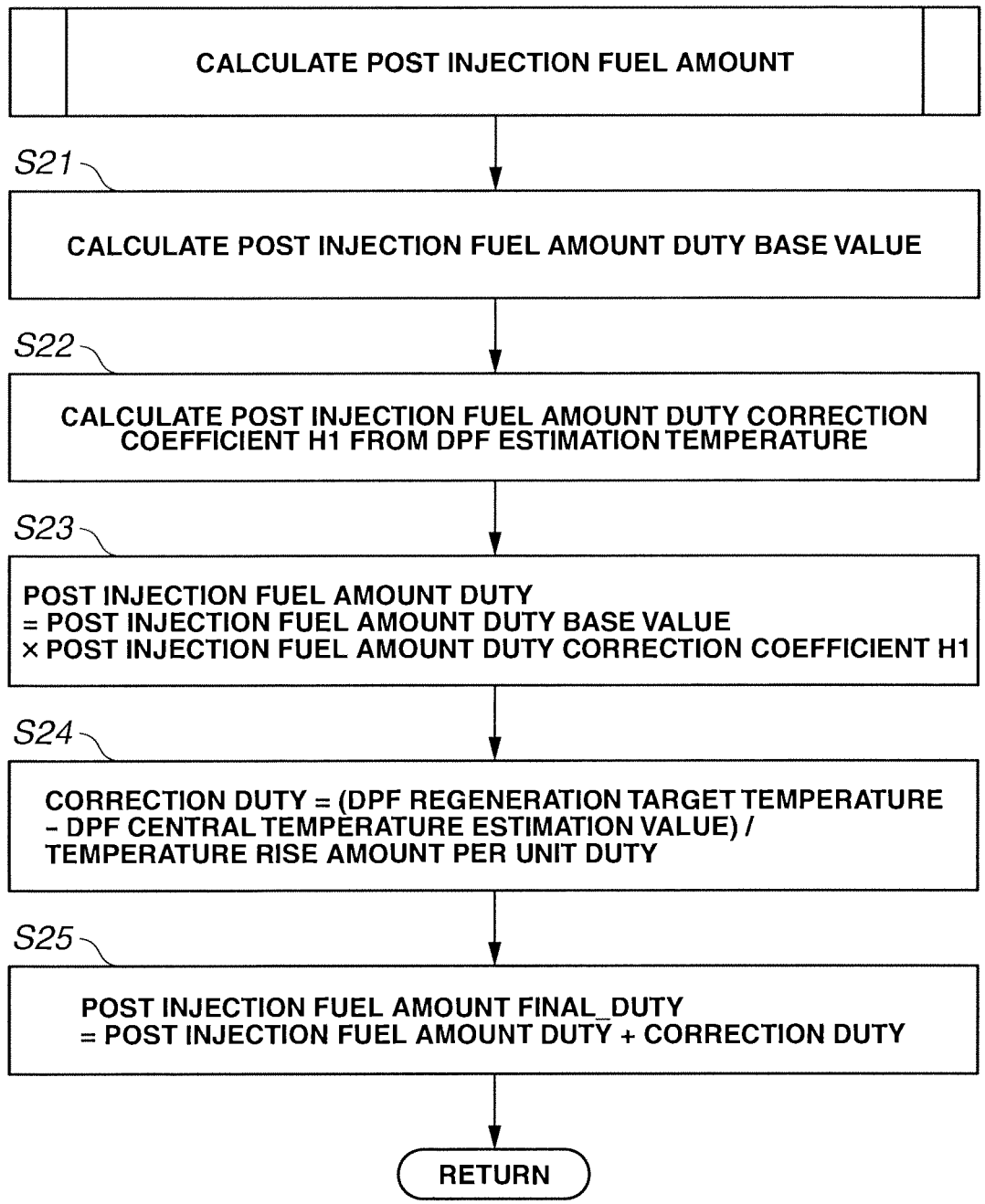
FIG. 4 is a flowchart of a subroutine of the routine which is executed for calculation of the post injection fuel amount as shown in FIG. 3, according to the first embodiment of the present invention.

FIG. 4 shows a subroutine of processing of calculation of the post injection fuel amount upon restarting the DPF regeneration, according to the first embodiment, which is executed in step S5 as shown in FIG. 3. In the first embodiment, for the sake of simplicity, the post injection fuel amount upon restarting the DPF regeneration is corrected to a side of reduction on the basis of only the DPF estimate temperature (the estimation value of the DPF central temperature). That is, the DPF estimate temperature after automatic restart of the engine is corrected to the side of increase in consideration of an increment in DPF temperature which is caused due to increase in the oxygen concentration, etc. in accordance with the idle stop (see FIG. 7). By setting the post injection fuel amount using a correction coefficient H1 of a duty value of the post injection fuel amount (i.e., duty correction coefficient H1) which is calculated on the basis of the DPF estimate temperature, the post injection fuel amount upon the DPF regeneration is corrected to the side of reduction.

Figure 8:
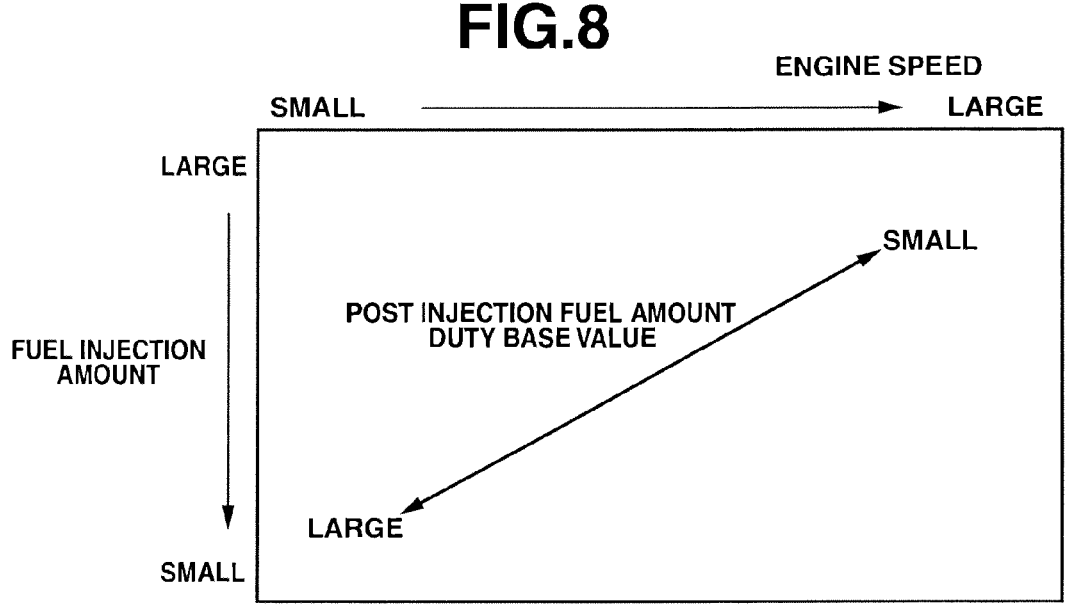
FIG. 8 is an explanatory diagram showing a map for controlling a duty base value of the post injection fuel amount.

In step S21, a duty base value of the post injection fuel amount is calculated on the basis of engine speed and an amount of the main injection by using a control map as shown in FIG. 8. As shown in FIG. 8, the duty base value of the post injection fuel amount is set so as to be increased on a low-speed and low-load side including idling (i.e., on the side of a small amount of the main injection) and be decreased on a high-speed and high-load side (i.e., on the side of a large amount of the main injection).

Figure 9:
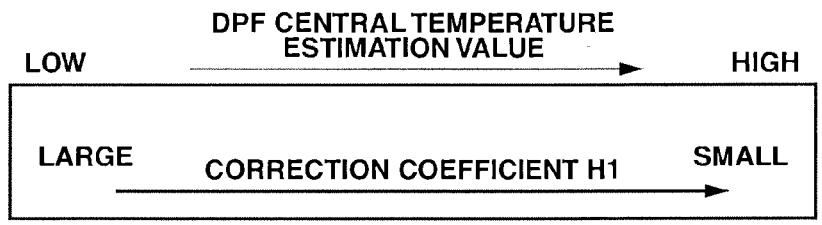
FIG. 9 is an explanatory diagram showing a table for controlling a duty correction coefficient of the post injection fuel amount with respect to the estimation value of the DPF central temperature.

In step S22, the duty correction coefficient H1 of the post injection fuel amount is calculated from the DPF estimate temperature by looking up a control table as shown in FIG. 9. The correction coefficient H1 is a value that is not larger than 1 so as to reduce the post injection fuel amount upon restarting the DPF regeneration. Further, the correction coefficient H1 is set to a small value such that excessive rise of the DPF temperature is prevented when the DPF estimate temperature is high, and the correction coefficient H1 is set to a large value such that the DPF temperature rise is promoted when the DPF estimate temperature is low. That is, as the DPF estimate temperature becomes higher, an increment of the DPF temperature rise with respect to the post injection fuel amount is increased. Therefore, as the DPF estimate temperature becomes higher, the correction coefficient H1 is set to a smaller value such that the post injection fuel amount is reduced. In step S23, the duty value of the post injection fuel amount is calculated by multiplying the duty base value of the post injection fuel amount and the duty correction coefficient H1 of the post injection fuel amount together.

In step S24, a correction duty value is calculated by dividing a difference between the DPF target temperature and the estimation value of the DPF central temperature by an amount of the DPF temperature rise per unit duty. That is, the correction duty value based on a deviation between the target value of the DPF temperature and an estimation value (an actual value) of the DPF temperature is calculated. Then, in step S25, a final duty value of the post infection amount as a final post injection fuel amount is calculated by adding the correction duty value to the duty value of the post injection fuel amount.

Figure 5:
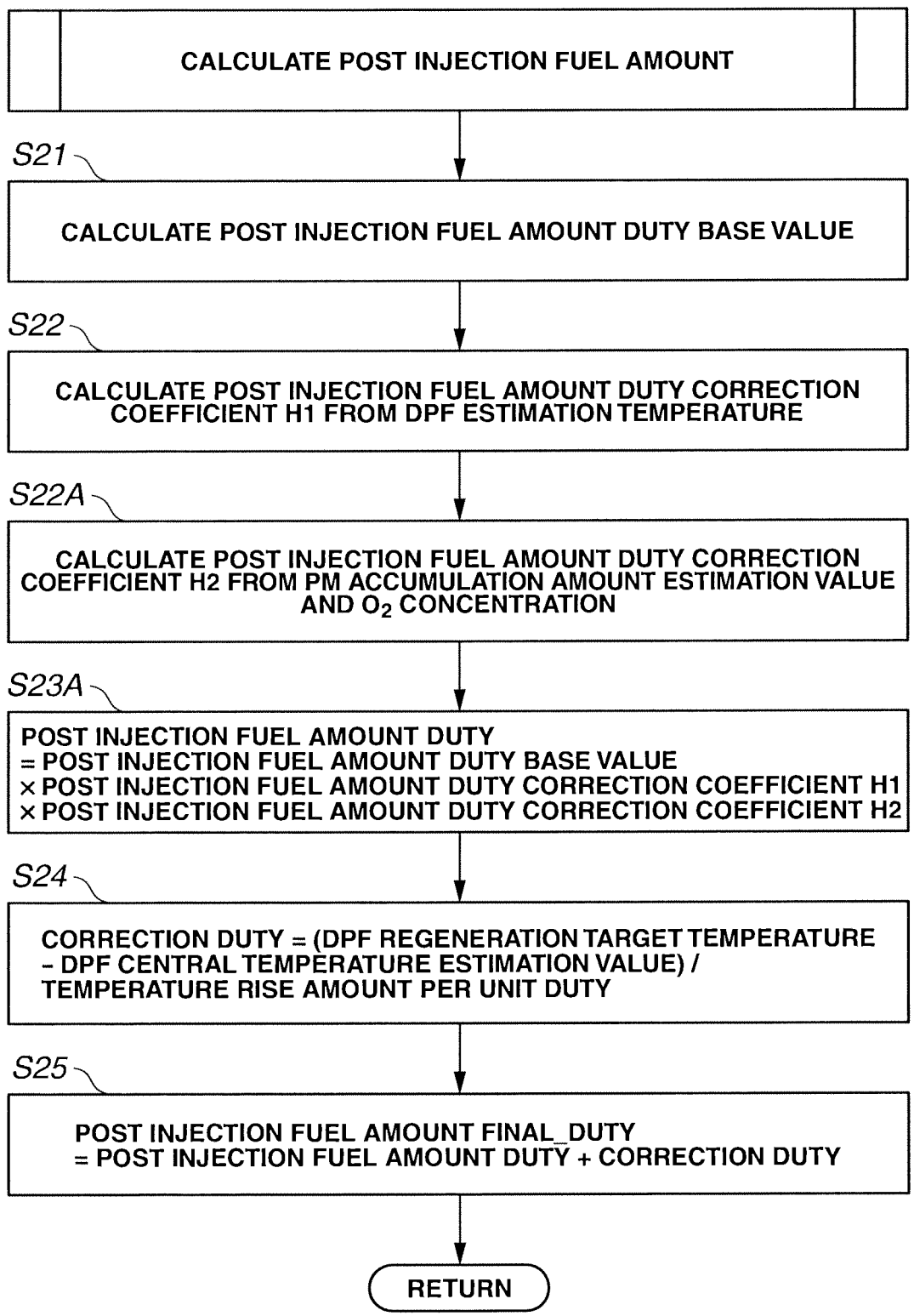
FIG. 5 is a flowchart of a subroutine of the routine which is executed for calculation of the post injection fuel amount as shown in FIG. 3, according to the second embodiment of the present invention.

FIG. 5 shows a subroutine of processing of calculation of the post injection fuel amount in step S5, according to the second embodiment, which is executed in step S5 as shown in FIG. 3. In the second embodiment, the post injection fuel amount is corrected to the side of reduction in consideration of not only the DPF estimate temperature, but also the PM accumulation amount and the oxygen concentration which have a large influence on excessive DPF temperature rise upon restarting the DPF regeneration. In a case where idle stop time is short, the oxygen concentration can be estimated using a detection value of exhaust air-fuel ratio sensor 20. Further, the oxygen concentration can also be estimated using idle stop time, engine speed upon idle stop (i.e., idle speed), and a cumulative value of the engine speed upon idle stop.

In step S21 and step S22, similarly to the first embodiment, the duty base value of the post injection fuel amount is calculated, and the correction coefficient H1 of the duty value of the post injection fuel amount is calculated, respectively.

Figure 10:
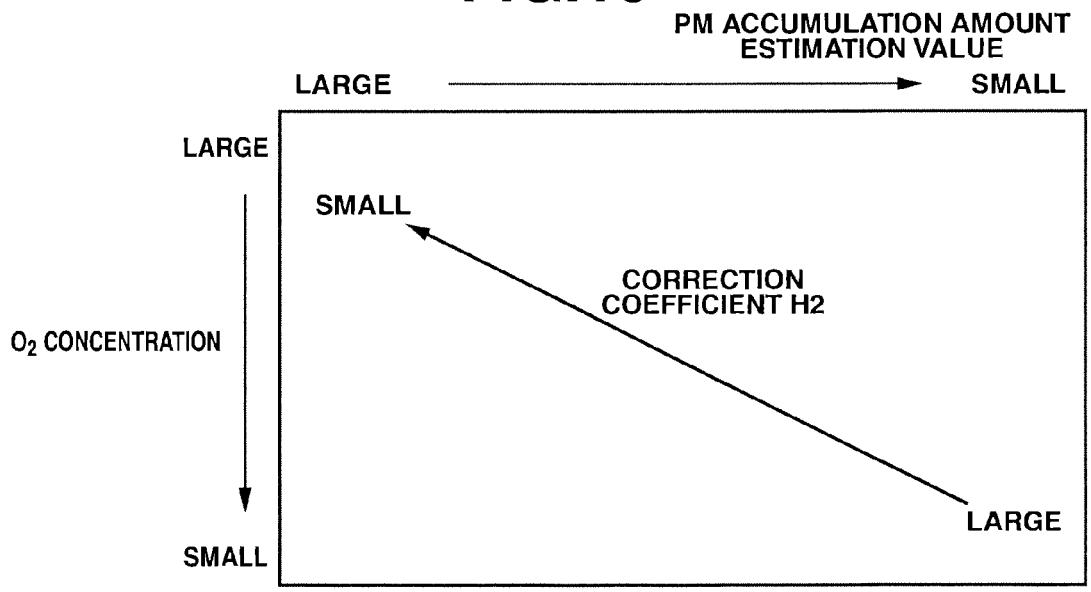
FIG. 10 is an explanatory diagram showing a map for controlling the duty correction coefficient of the post injection fuel amount with respect to oxygen concentration in exhaust gas and engine speed.

In step S22A, as shown in a control map of FIG. 10, a second correction coefficient H2 of the duty value of the post injection fuel amount is calculated on the basis of the PM accumulation amount estimation value and the oxygen concentration. As the oxygen concentration becomes higher, oxidation reaction upon restarting the DPF regeneration is further promoted to thereby cause further DPF temperature rise. Therefore, as shown in FIG. 10, as the oxygen concentration becomes higher, the correction coefficient H2 is set to a smaller value so as to suppress the DPF temperature rise. That is, the correction coefficient H2 is set such that as the oxygen concentration becomes higher, the post injection fuel amount is reduced. In addition, as the PM accumulation amount estimation value becomes larger, oxidation reaction upon restarting the DPF regeneration is further promoted to thereby cause further DPF temperature rise. Therefore, the correction coefficient H2 is set to such a small value as to suppress the DPF temperature rise. That is, the correction coefficient H2 is set such that as the PM accumulation amount is increased, the post injection fuel amount is reduced.

In step S23A, the duty value of the post injection fuel amount is calculated by multiplying the duty base value of the post injection fuel amount by the duty correction value H1 of the post injection fuel amount and the duty correction value H2 thereof. In step S24 and step S25, similarly to the first embodiment, the correction duty value is calculated, and the final duty value of the post infection amount as the final post injection fuel amount is calculated by adding the correction duty value to the duty value of the post injection fuel amount.

In the second embodiment as explained above, not only the DPF estimate temperature but also the PM accumulation amount and the oxygen concentration which have a large influence on the DPF temperature rise upon restarting the DPF regeneration are considered, so that the post injection fuel amount can be corrected to the side of reduction with a higher accuracy.

Figure 6:
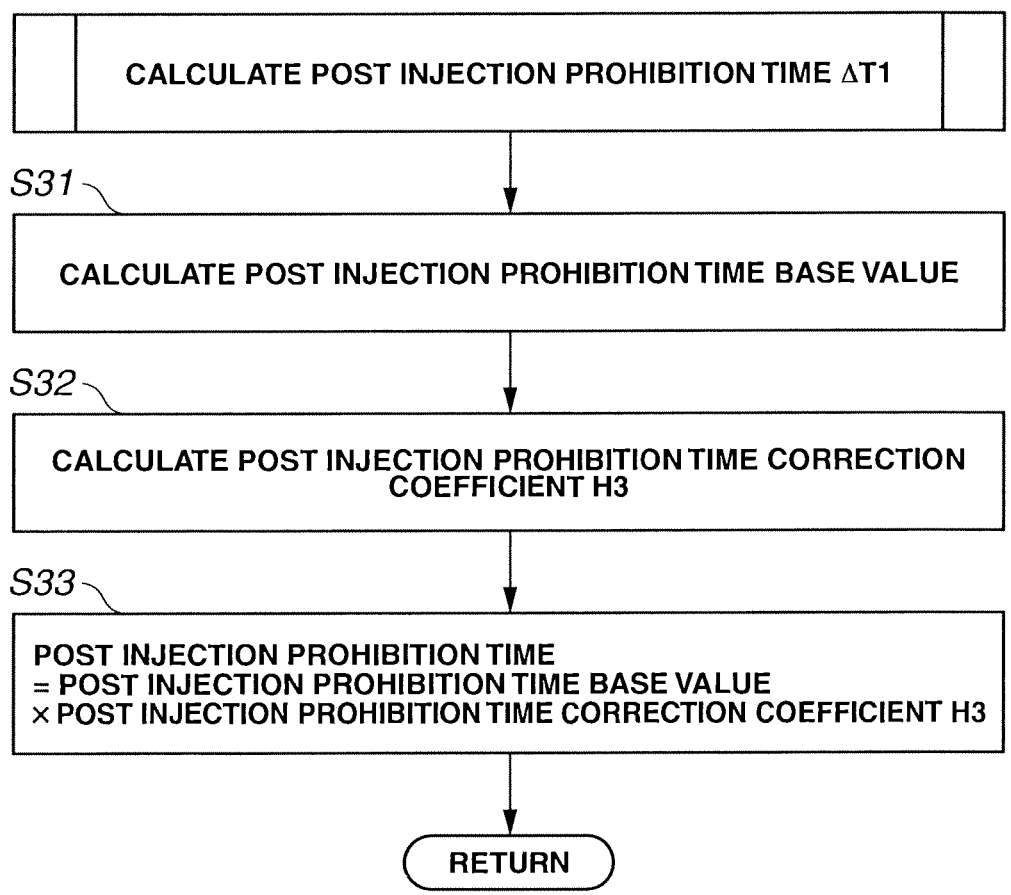
FIG. 6 is a flowchart of a subroutine of the routine which is executed for calculation of a post injection prohibition time as shown in FIG. 3.
Figure 11:
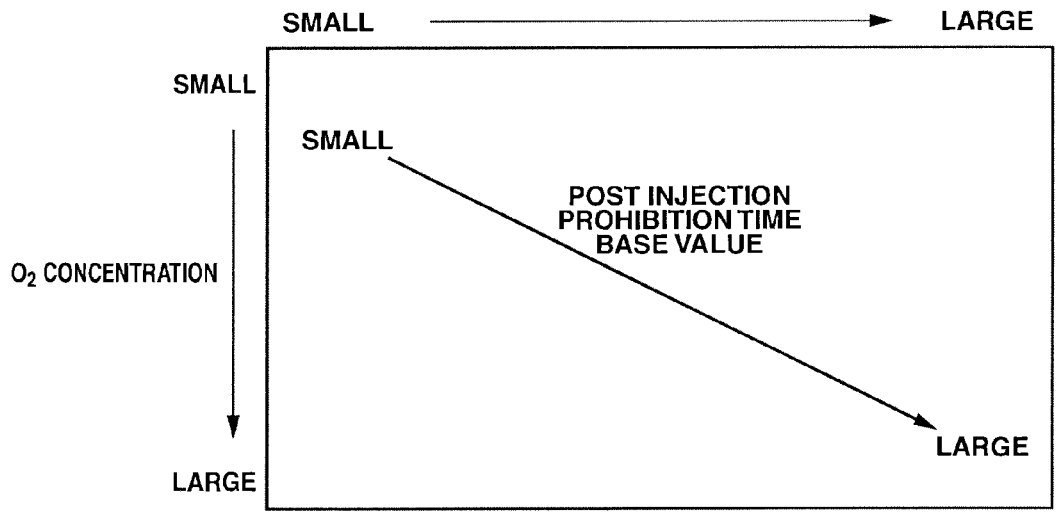
FIG. 11 is an explanatory diagram showing a map for controlling a base value of the post injection prohibition time.

FIG. 6 shows a subroutine of processing of calculating the post injection prohibition time ΔT1 which is executed in step S6 as shown in FIG. 3. In step S31, a base value of the post injection prohibition time is calculated on the basis of the oxygen concentration and the PM accumulation amount estimation value by looking up a control table as shown in FIG. 11. As the oxygen concentration becomes higher, oxidation reaction immediately after restart of the DPF regeneration is further promoted, so that excessive DPF temperature rise tends to occur. Therefore, as shown in FIG. 11, as the oxygen concentration becomes higher, the base value of the post injection prohibition time is set to a larger value so as to avoid a peak region (see a portion as indicated by sign P in FIG. 2) in which the DPF temperature immediate after restart of the DPF regeneration temporarily becomes higher. That is, the base value of the post injection prohibition time is set such that as the oxygen concentration becomes higher, the post injection prohibition time $\Delta T1$ is increased. Similarly, as the PM accumulation amount estimation value becomes larger, oxidation reaction immediately after restart of the DPF regeneration is further promoted, so that excessive DPF temperature rise tends to occur. Therefore, as the PM accumulation amount estimation value becomes larger, the base value of the post injection prohibition time is set to a larger value so as to avoid the peak region (see the portion as indicated by sign P in FIG. 2) in which the DPF temperature immediate after restart of the DPF regeneration temporarily becomes higher. That is, the base value of the post injection prohibition time is set such that as the PM accumulation amount becomes larger, the post injection prohibition time $\Delta T1$ is increased.

Figure 12:
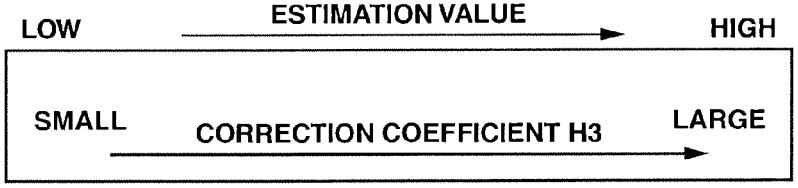
FIG. 12 is an explanatory diagram showing a map for controlling a correction coefficient of the post injection prohibition time.

In step S32, a correction coefficient H3 of the post injection prohibition time is calculated from the estimation value of the DPF central temperature (the DPF estimate temperature) by looking up a control table as shown in FIG. 12. As shown in FIG. 12, as the estimation value of the DPF central temperature becomes higher, the correction coefficient H3 is set to a larger value such that the post injection prohibition time is increased to thereby suppress excessive DPF temperature rise immediately after restart of the DPF regeneration. Then, in step S33, a final post injection prohibition time $\Delta T1$ is calculated by multiplying the base value of the post injection prohibition time and the correction coefficient H3.

Figure 7:
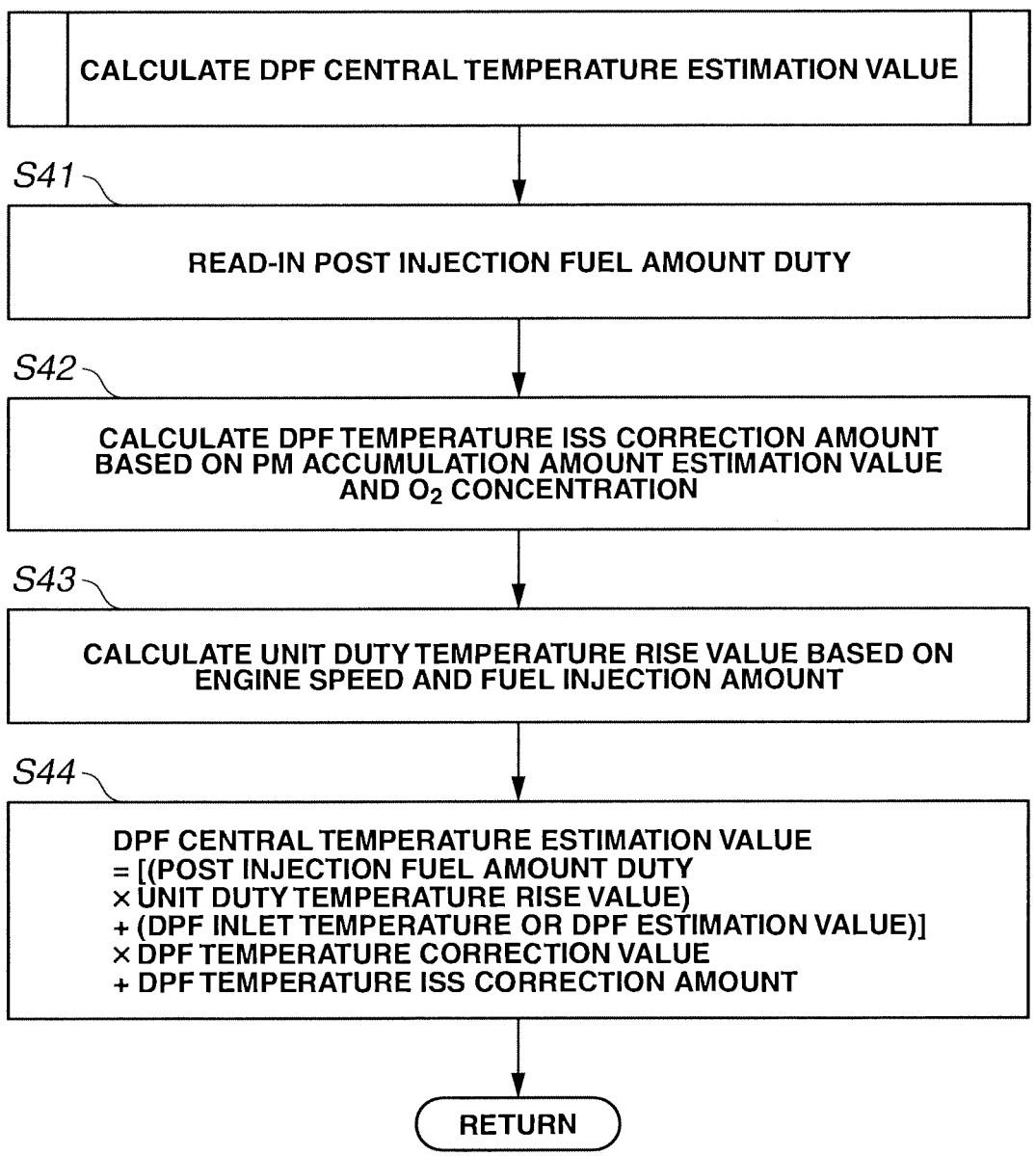
FIG. 7 is a flowchart of a subroutine of the routine which is executed for calculation of an estimation value of a DPF central temperature as shown in FIG. 3.

FIG. 7 shows a subroutine of processing of calculating of the estimation value of the DPF central temperature which is executed in step S4 in FIG. 3. The estimation value of the DPF central temperature which is calculated in this subroutine is an estimation value based on consideration of an amount of the DPF temperature rise due to increase in the oxygen concentration during idle stop in a case where the post injection is carried out upon restarting of the DPF regeneration.

Figure 13:
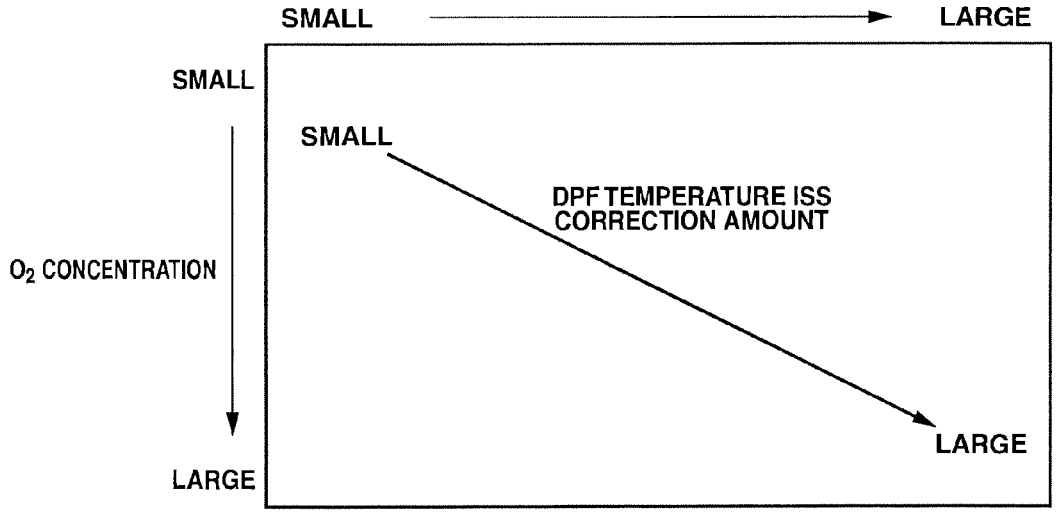
FIG. 13 is an explanatory diagram showing a map for controlling a correction amount of DPF temperature ISS.
Figure 14:
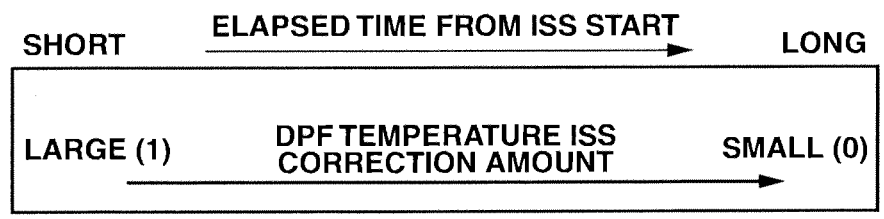
FIG. 14 is an explanatory diagram showing a table for controlling a correction amount of DPF temperature ISS with respect to elapsed time from starting ISS.

In step S41, the duty value of the post injection fuel amount is read in. In step S42, a DPF temperature ISS (idle stop start) correction amount is calculated on the basis of the PM accumulation amount estimation value and the oxygen concentration by looking up a control map as shown in FIG. 13. As the oxygen concentration becomes higher, the DPF temperature rise upon restarting the DPF regeneration becomes larger. Therefore, as shown in FIG. 13, as the oxygen concentration becomes higher, the DPF temperature ISS correction amount is set to a larger value so as to suppress the DPF temperature rise. Similarly, as the PM accumulation amount estimation value becomes larger, the DPF temperature rise upon restarting the DPF regeneration becomes larger. Therefore, as the PM accumulation amount estimation value becomes larger, the DPF temperature ISS correction amount is set to a larger value so as to suppress the DPF temperature rise. Further, as an elapsed time from engine automatic restart (ISS) becomes longer, influence of excessive oxygen concentration due to idle stop is reduced so that influence of excessive temperature rise of the DPF is lessened. Therefore, as shown in FIG. 14, as the elapsed time from a start time of the engine automatic restart becomes longer, the DPF temperature ISS correction amount is set to a smaller value, and finally set to 0. That is, the correction by the DPF temperature ISS correction amount is carried out only within a predetermined elapsed time from the start of engine automatic restart.

Figure 15:
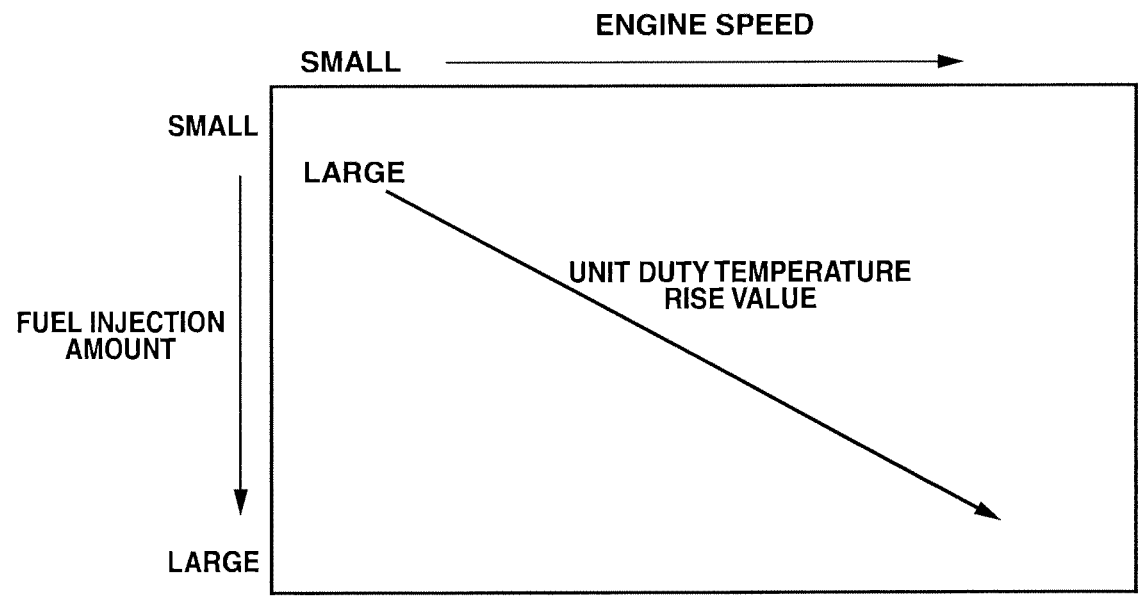
FIG. 15 is an explanatory diagram showing a map for controlling a temperature rise value per unit duty.

In step S43, a unit duty DPF temperature rise value (a DPF temperature rise value per unit duty) is calculated on the basis of the engine speed and the fuel injection amount by looking up a control map as shown in FIG. 15. In step S44, a final estimation value of the DPF central temperature is calculated using the duty value of the post injection fuel amount, the unit duty DPF temperature rise value, a DPF inlet temperature that is detected by temperature sensor 21 (or the DPF temperature estimation value), a DPF temperature correction amount determined in consideration of heat of HC oxidation reaction, and the DPF temperature ISS correction amount.

Further, end of the DPF regeneration is judged and executed by another routine not shown. As generally known, for instance, in a case where the PM accumulation amount is reduced to not larger than a predetermined amount, or in a case where exhaust pressure is reduced to not larger than a predetermined value, the DPF regeneration is ended.

Figure 16:
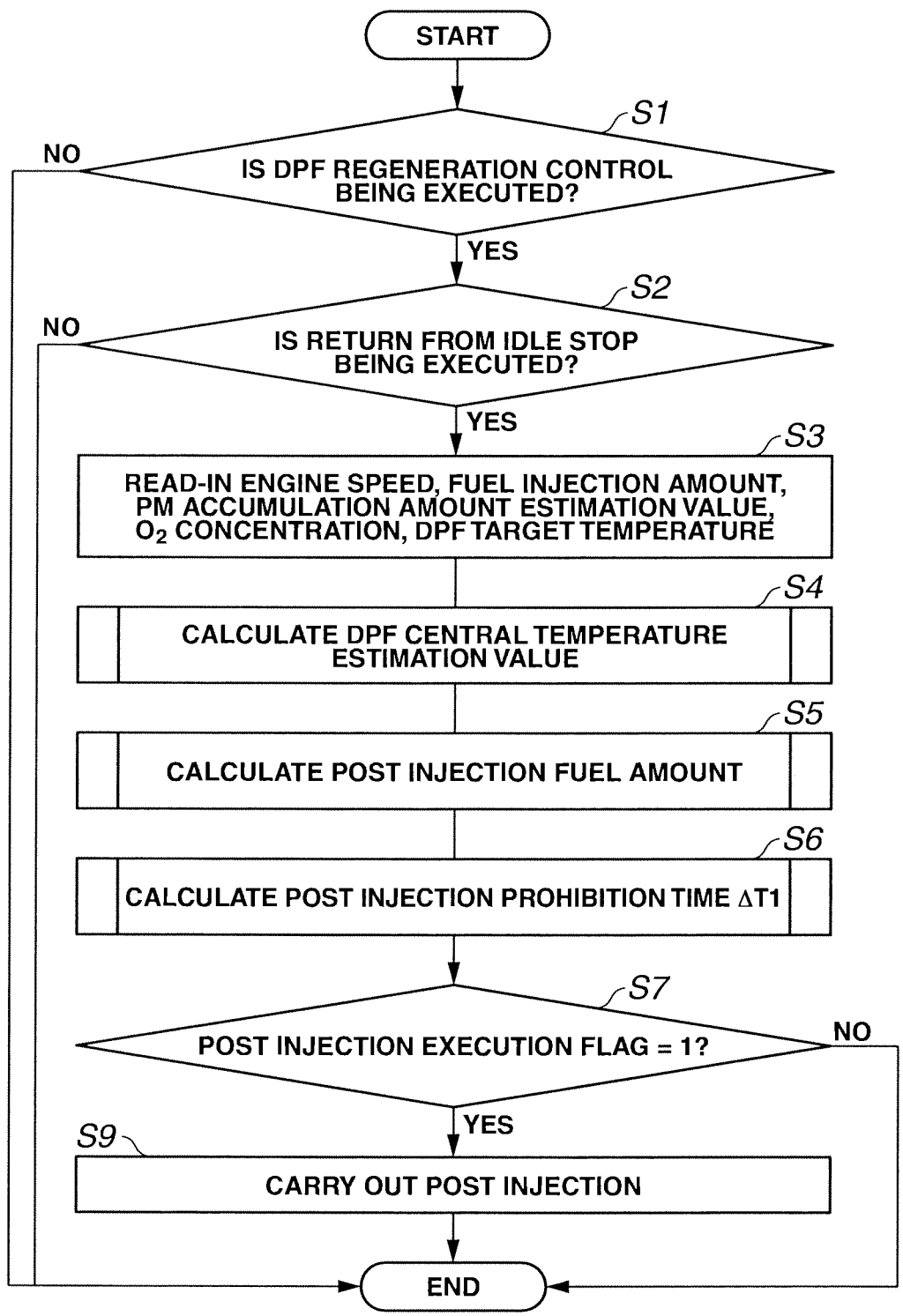
FIG. 16 is a flowchart of a routine which is executed for control of restart of DPI regeneration upon automatic restart of the engine according to a third embodiment of the present invention.

FIG. 16 shows a routine of a third embodiment that differs from the first and second embodiments in that setting of the post injection prohibition time $\Delta T1$ is omitted. Like reference numerals denote like processing contents, and therefore, detailed explanations therefor are omitted. That is, in the third embodiment, setting of the post injection prohibition time which is executed in step S8 and step S10 as shown in FIG. 3 is omitted. Even in this case, similarly to the first and second embodiments, when the DPF regeneration is restarted after automatic restart of the engine, the post injection fuel amount is corrected to the side of reduction so as to suppress the DPF temperature rise due to the DPF regeneration in consideration of an increment of the oxygen concentration in exhaust gas during idle stop that interrupts the DPF regeneration. As a result, it is possible to suppress excessive temperature rise of the DPF upon restarting the DPF regeneration.

In the first and second embodiments, reduction of the post injection fuel amount and setting of the post injection prohibition time are carried out as control for suppressing temperature rise upon restarting the DPF regeneration. On the other hand, in the third embodiment, only the reduction of the post injection fuel amount is carried out. However, conversely, only the setting of the post injection prohibition time may be carried out.

The invention claimed is:

1. An exhaust gas purifying system for a diesel engine that carries out idle stop to automatically stop the diesel engine during an idling operation, the exhaust gas purifying system comprising: a diesel particulate filter (DPF) disposed in an exhaust system of an engine and serving to trap particulate matter present in exhaust gas; and a controller configured to control: a DPF regeneration section to execute DPF regeneration for the diesel particulate filter by raising a temperature of the DPF when a predetermined DPF regeneration condition is satisfied: a DPF regeneration interruption section to interrupt the DPF regeneration and to execute idle stop in a case where shift to the idling operation is carried out during the DPF regeneration; a DPF regeneration restart section to restart the DPF regeneration after the engine is automatically restarted from interruption of the DPF regeneration; and a correction section to correct DPF regeneration control so as to suppress temperature rise due to the DPF regeneration in consideration of an increment in oxygen concentration in the exhaust gas which is caused due to idle of the engine during idle stop, when the DPF regeneration is restarted.

2. The exhaust gas purifying system for a diesel engine as claimed in claim 1, wherein subsequent to main injection of fuel in the vicinity of a compression top dead center, the controller is configured to control the DPF regeneration section to carry out post injection of fuel at a non-ignition timing on or after an expansion stroke.

3. The exhaust gas purifying system for a diesel engine as claimed in claim 2, wherein the controller is configured to control the correction section to prohibit the post injection during a predetermined prohibition period after the engine is automatically restarted.

4. The exhaust gas purifying system for a diesel engine as claimed in claim 3, wherein as an amount of the particulate matter accumulated in the diesel particulate filter becomes larger, the controller is configured to increase the prohibition period.

5. The exhaust gas purifying system for a diesel engine as claimed in claim 3, wherein as the oxygen concentration in the exhaust as becomes higher, the controller is configured to increase the prohibition period.

6. The exhaust gas purifying system for a diesel engine as claimed in claim 3, wherein as a DPF temperature of the diesel particulate filter becomes higher, the controller is configured to increase the prohibition period.

7. The exhaust gas purifying system for a diesel engine as claimed in claim 2, wherein the controller is configured to control the correction section to correct a post injection amount of fuel for the post injection to a side of reduction.

8. The exhaust gas purifying system for a diesel engine as claimed in claim 7, wherein as an amount of the particulate matter accumulated in the diesel particulate filter becomes larger, the controller is configured to reduce the post injection amount of fuel.

9. The exhaust gas purifying system for a diesel engine as claimed in claim 7, wherein the controller is configured to control the correction section to reduce the post injection amount of fuel as the oxygen concentration in the exhaust gas becomes higher.

10. The exhaust gas purifying system for a diesel engine as claimed in claim 7, wherein the controller is configured to control the correction section to reduce the post injection amount of fuel as a DPF temperature of the diesel particulate filter becomes higher.

11. The exhaust gas purifying system for a diesel engine as claimed in claim 2, wherein the controller is configured to set the post injection amount of fuel on the basis of a DPF temperature of the diesel particulate filter such that as the DPF temperature of the diesel particulate filter becomes higher, the post injection amount of fuel is reduced, and to control the correction section to correct the DPF temperature to a side of increase.

* * * * *